3,530,177
2,6-XYLENOL-3-SULFONYL CHLORIDE AND
2,6-XYLENOL-4-SULFONYL CHLORIDE
Walter L. Hall, Schenectady, N.Y., assignor to General
 Electric Company, a corporation of New York
No Drawing. Original application Feb. 1, 1965, Ser. No.
 429,652, now Patent No. 3,337,512, dated Aug. 22,
 1967. Divided and this application Apr. 19, 1967, Ser.
 No. 631,849
Int. Cl. C07c 143/70
U.S. Cl. 260—543                                    3 Claims

ABSTRACT OF THE DISCLOSURE

The compounds, 2,6 - xylenol-3-sulfonyl chloride, 2,6-xylenol-4-sulfonyl chloride and mixtures thereof, are new chemical compounds useful for making polymeric aromatic sulfonates by a self-condensation reaction.

---

This application is a division of my copending application, Ser. No. 429,652, filed Feb. 1, 1965, now U.S. Pat. 3,337,512.

This invention relates to the new chemical compounds, 2,6 - xylenol - 3-sulfonyl chloride, 2,6-xylenol-4-sulfonyl chloride and mixtures thereof. The polymers produced by the self-condensation of these compounds whereby the sulfonyl chloride of one molecule reacts with the hydroxyl group of another molecule splitting off hydrogen chloride and forming a poly (2,6-xylysulfonate) are claimed in my above-identified application from which this application has been divided.

Polymeric aromatic sulfonates have been prepared by the reaction of a biphenol and an aromatic disulfonyl halide. In this reaction, in order to obtain high molecular weight products, it is necessary to carry out the reaction in a two-phase reaction in which the aromatic disulfonyl chloride is in an organic phase and the diphenol is dissolved in an aqueous phase with alkali. It is further necessary that equal molar amounts of the two reactants be used to obtain high molecular weight products. Insofar as I am able to ascertain, no one has ever been able to make high molecular weight products by the self-condensation of an aromatic compound which contains both a phenolic group and a sulfonyl chloride group as substituents on the same aryl ring. This may well be due to the fact that the chlorosulfonation of phenols generally leads to a mixture of compounds which is not easily separated. Even those few phenolsulfonyl chlorides which can be made, for example, 2,6-dichlorophenol-4-sulfonyl chloride, if they form polymers at all, form only low molecular weight, apparently cyclic compounds, which can not be reacted further to form high molecular weight polymers.

I have now found that 2,6-xylenol, also named 2,6-dimethylphenol, can be readily chlorosulfonated with chlorosulfonic acid to produce a mixture of 2,6-xylenol-4-sulfonyl chloride and 2,6-xylenol-3-sulfonyl chloride. This mixture of compounds can be used as prepared or the mixture of the two compounds can be readily separated into the two isomers prior to making the polymeric condensation product. These two isomeric 2,6-xylenol-sulfonyl chlorides can also be readily produced by reacting the corresponding sulfonic acids with a chlorinating agent such as thionyl chloride. These two 2,6-xylenol-sulfonyl chlorides have never been prepared before insofar as I can determine. I have found further that these two compounds when dissolved in an organic solvent, will condense with themselves or each other, under anhydrous conditions in the presence of a hydrogen halide acceptor, to form high molecular weight essentially linear poly (2,6-xylylsulfonates). These polymers are likewise new compositions of matter which have many valuable properties. For example, they are extremely resistant to alkalis and acids. They can be shaped or molded into useful fabricated shapes or they can be cast into films or drawn into fibers.

The best method for preparing 2,6-xylenol-4-sulfonyl chloride is by sulfonation of 2,6-xylenol to form 2,6-xylenol-4-sulfonic acid which is isolated in the form of its alkali metal salt, for example, the sodium salt, following the procedure described by P. Karrer and P. Leiser, in Helv. Chim. Acta 27, 678 (1944). The reaction of the sodium salt of 2,6-xylenol-4-sulfonic acid with thionyl chloride readily converts the sodium salt to the corresponding 2,6-xylenol-4-sulfonyl chloride, free of any of the 2,6-xylenol-3-sulfonyl chloride isomer.

The method of preparing 2,6-xylenol-3-sulfonyl chloride is as a mixture with 2,6-xylenol-4-sulfonyl chloride followed by separation of the isomers. I have determined that when 2,6-xylenol is chlorosulfonated that the product is a mixture of approximately 85 mole percent 2,6-xylenol-3-sulfonyl chloride and 15 mole percent 2,6-xylenol-4-sulfonyl chloride. This mixture can be used as such or it can be separated to isolate the 2,6-xylenol-3-sulfonyl chloride, by fractional crystallization and sublimation from the other isomer.

In order that those skilled in the art may better understand my invention, the following examples are given by way of illustration and not by way of limitation. In all the examples the percentages and parts are by weight unless specifically stated otherwise.

EXAMPLE I

This example illustrates the preparation of a mixture of 2,6-xylenol-3-sulfonyl chloride and 2,6-xylenol-4-sulfonyl chloride, and the separation of 2,6-xylenol-3-sulfonyl chloride from this mixture. To a suspension of 50 g. of 2,6-xylenol in 50 ml. of carbon disulfide cooled to −35° C., 300 g. of chlorosulfonic acid was added dropwise over a period of 35 minutes. The temperature of the reaction mixture was allowed to rise slowly over a period of 12 hours to room temperature where it was maintained for an additional 7 hours. The reaction mixture was added cautionusly to 1000 g. of ice. After the ice melted, the precipitate was isolated by filtration. After washing several times with distilled water, the precipitate was vacuum dried at room temperature. The crude product weighed 30.9 g. The solid was extracted with hot ligroin and the insoluble material was recrystallized from hot mixture of 1 volume of toluene to 4 volumes of ligroin. Recrystallization a second time from the same solvent mixture yielded a white solid. The needle-like crystals, which were isolated, were vacuum dried and sublimed at 52° C. under 5 microns pressure. The white sublimed solid had a melting point of 90° C. Elemental analysis showed the material to be 43.7% C., 4.1% H, and 15.8% Cl, which is in agreement with the calculated values of 43.5% C., 4.1% H, and 16.1% Cl. The molecular weight as determined by the Mechrolab Osmometer was 219±5% using chloroform as the solvent. Both the NMR and IR spectra were in accordance with the chlorosulfonyl group being in the 3-position adjacent to the methyl group. All these data show that the product was 2,6-xylenol-3-sulfonyl chloride.

The NMR spectrum showed the presence of two different methyl groups at 2.3δ and 2.6δ in the ratio of 1 to 1 and an AB pattern for 2 aromatic hydrogen atoms between 7.0δ and 7.7δ. The phenolic proton appeared at 5.1δ. The infrared spectrum showed two strong bands at 810 and 860 cm.$^{-1}$ characteristic of 1,2,3,4 benzene ring substitution, which is the order of substitution in 2,6-xylenol-3-sulfonyl chloride if numbering is started at the methyl group in the 6-position.

EXAMPLE II

This example illustrates the preparation of 2,6-xylenol-4-sulfonyl chloride. Sodium 2,6-xylenol-4-sulfonate was prepared by the method of Karrer and Leiser, (previously referenced). A solution of 22.4 g. of the sodium salt in 40 ml. of dimethylformamide was cooled to 0° C. To this solution, 33.0 g. of thionyl chloride was added dropwise over a 10 minute period. The cooling bath was removed whereupon the temperature rose to 39° C. due to the exothermic nature of reaction. After a total reaction time of 52 minutes, the reaction mixture was added cautiously to 100 g. of ice. After the ice melted, the white solid which formed was isolated by filtration and washed several times with distilled water. After vacuum drying at room temperature, that isolated solid which weighed 19.8 g. was dissolved in a minimum amount of toluene and the solution dried with anhydrous sodium sulfate. An approximately equal volume of n-hexane was added to the dried solution. The solution was then cooled to 0° C. The crystals which formed, were isolated by filtration and vacuum dried to yield 13.5 g. product which had a melting point 135±1° C.

Elemental analysis showed that the product had 43.6% C, 4.1% H and 16.1% Cl in good agreement with the calculated values of 43.5% C, 4.1% H and 16.1% Cl. Both the NMR and IR spectra were in accord with chlorosulfonyl group being in the 4-position. All these data show that the product was 2,6-xylenol-4-sulfonyl chloride.

The NMR spectrum show 1 methyl hydrogen peak at 2.4$\delta$, a single aromatic hydrogen peak at 7.1$\delta$ and a phenolic proton a 5.7$\delta$ in the ratios of 6 to 2 to 1. The infrared spectrum showed a strong band at 900 cm.$^{-1}$ characteristic of 1,2,3,5 benzene substitution which is the order of substitution in 2,6-xylenol-4-sulfonyl chloride when numbering is started from the methyl group in the 6-position.

The poly(2,6-xylyl-4-sulfonate), poly(2,6-xylyl-3-sulfonate), and copolymers of these two polymers prepared from the compounds of this invention have a wide variety of uses. As coating compositions they may be coated onto metallic or nonmetallic substrates, by flame spraying, melt casting, or by casting while dissolved in one of the solvents in which it is made, or other solvent in which it is soluble, and thereafter evaporating the solvent at an elevated temperature, and if desired, at reduced pressure. The hot solution of the solvent may be forced through a spinneret into a heated drying tower, preferably maintained at a reduced presure, to form filaments or fibers, or the molten polymer may be forced through spinnerets by well known techniques to form filaments and fibers. Other uses are more fully described in by above-identified copending application, Ser. No. 429,652, now U.S. 3,337,512, from which this application was divided.

What I claim as new and desire to secure by Letters Patent of the United States is:

1. A xylenolsulfonyl chloride selected from the group consisting of 2,6-xylenol-3-sulfonyl chloride, 2,6-xylenol-4-sulfonyl chloride and mixtures thereof.
2. The compound of claim 1 named 2,6-xylenol-3-sulfonyl chloride.
3. The compound of claim 1 named 2,6-xylenol-4-sulfonyl chloride.

References Cited

Karrer, Helvica Chimica Acta vol. 27 (1944), pp. 678–684.

LORRAINE A. WEINBERGER, Primary Examiner

E. J. GLEIMAN, Assistant Examiner